Patented July 23, 1935

2,009,181

UNITED STATES PATENT OFFICE 2,009,181

PROCESS FOR OBTAINING OPIUM ALKALOIDS FROM DRIED POPPY STRAW

János Kábay, Budszentmihaly, Hungary

No Drawing. Application November 25, 1932, Serial No. 644,400. In Hungary November 30, 1931

7 Claims. (Cl. 87—28)

The invention regards a process for obtaining opium alkaloids from straw containing the same especially from poppy-plants. In the sense of the invention the poppy-plant straw is treated in a ripe and dry condition. The dried portions of the plant are suitably chopped up, are then treated with an extracting-liquid and the extract obtained with the extracting-liquid is worked upon for opium alkaloids.

The process is advantageously carried out by treating the dry straw from the plant in several containers at the same time, whereby the extracting liquid is conducted through the containers in turn according to the eddy principle until the concentration of the opium alkaloids in the extracting-liquid is approximately equal to the opium concentration of the plants on which extraction is practised.

As extracting liquid watery solutions of mediums which form with the opium alkaloids combinations soluble in water are employed. Such are for example the watery solutions of mineral acids, thus hydrochloric acid, sulphuric acid and sulphurous acids or salts, e. g. sodium bisulphide. The concentration of this extracting-liquid is advantageously 1.5%–2%. The chopped poppy is treated with this extracting liquid in eddies till the concentration of opium-alkaloids in the liquid approaches the concentration of opium alkaloids of the portions of plant.

In the following it is assumed that the apparatus consists of 8 containers, each container holding 1000 litres of ripe, dry, chopped poppystraw. As the extracting-liquid, the 1.5%–2% watery solution of sulphurous acid is employed, 1000 litres of which is brought in eddies into each of the containers holding chopped plants. The concentrated liquid about 1000 litres, let out of the last container is advantageously stewed down in a vacuum to about ⅕, i. e. 200 litres volume. The degree of acidity of this liquid is lessened by the addition of lye to about 0.1%–2%. For this purpose lyes are advantageously used the salts of which formed with sulphurous acid are difficult to dissolve. As such for instance hydroxid of calcium proved to be good. Beside this a like volume, i. e. 200 litres of ethyl alcohol is added to the extract. The ethyl alcohol precipitates the impurities, e. g. albumen substances, gummysubstances and saccharates. This precipitate, together with the sodium-precipitate, is removed from the solution, e. g. by filtering or by centrifugal force. Then the filtrate is concentrated, likewise in a vacuum, to ⅕, i. e. 40 litres volume, and then the like volume, i. e. 40 litres, of ethyl alcohol is added to the solution and so much sodium lye is required to dissolve the entire content of morphine. For this purpose ½% of lye overplus will generally suffice. The greater part of the by-alkaloids, e. g. narcotine, codeine and narceine fall out, together with the impurities still present in the solution. The latter are separated from the solution by means of filtering. Then the filtrate is weakly acidified by means of hydrochloric acid, in order to render a further concentration possible. Then the filtrate is stewed down in a vacuum to about ⅓ of its volume, i. e. 15 litres. If this solution is then made weakly alkaline, the crude morphine will fall out. It is purified in any well-known manner, e. g. by crystallizing out of water. As the process described, 700–800 grams of pure morphine have been obtained from 1000 kilograms of ripe, dry chopped poppy straw.

From the precipitate obtained and removed after the addition of sodium lye the by-alkaloids can be dissolved out by means of organic dissolving agents e. g. benzol and then further treated in any well-known manner.

A substantial advantage of the process described is that the seed-product of the poppy plant can be utilized and that a raw material which was hitherto regarded as entirely worthless is dealt with.

What I claim is:

1. A process for obtaining opium alkaloids consisting in extracting opium alkaloids from the straw of ripe, dry plants with an aqueous solution of a mineral acid which dissolves the opium alkaloids, then evaporating the extract, reducing the degree of acidity by adding lye, precipitating the impurities by means of ethyl alcohol, separating the precipitate from the solution, again evaporating the solution, then precipitating the remaining impurities by adding ethyl alcohol, then adding alkali lye to retain the morphine in solution and precipitate the by-alkaloids, then separating the precipitate from the solution and treating the remaining solution for morphine.

2. A process for obtaining opium alkaloids consisting in extracting opium alkaloid from the straw of ripe, dry plants with an aqueous solution of a mineral acid which dissolves the opium alkaloids, then evaporating the extract, reducing the degree of acidity by adding lye, precipitating the impurities by means of ethyl alcohol, separating the precipitate from the solution, again evaporating the solution, then precipitating the remaining impurities by adding ethyl alcohol, separating the precipitate from the solution by adding alkali-lye to precipitate the by-alkaloids and retain the morphine in solution, then separating the remaining precipitate from the solution, and separating the morphine from the solution by adding ammonia.

3. A process for obtaining opium alkaloids consisting in extracting opium alkaloids from the straw of ripe, dry plants with an aqueous solution of a mineral acid which dissolves the opium alkaloids, then evaporating the extract, reducing the degree of acidity by adding lye, precipitating the impurities by means of ethyl alcohol, separating the precipitate from the solution, again evaporating the solution, subjecting the evaporated solution to a precipitating process to remove the remaining impurities, then adding alkali lye to retain the morphine in solution and precipitate the by-alkaloids, dissolving the by-alkaloids out of the precipitate by means of organic solvents and treating the solution to extract the by-alkaloids.

4. The process of extracting alkaloids from dry ripe poppy straw which consists in comminuting dry ripe poppy straw, subjecting the straw to a bath of an aqueous solution of a mineral acid, evaporating the solution to approximately one-fifth of its original volume to produce a concentrate, neutralizing the concentrate by adding a lye forming a difficultly soluble salt with the acid, adding ethyl alcohol to the concentrate in an amount equal in volume to said concentrate and thereby precipitating impurities from the solution, removing the precipitate from the alcoholized concentrate, evaporating the alcoholized concentrate to form a solution of approximately one-fifth the volume of the original concentrate, adding to the second concentrate an equal bulk of ethyl alcohol and sufficient soda lye to dissolve all morphine whereby to precipitate all remaining impurities and by-alkaloids, removing this second precipitate, treating the remaining concentrate with hydro-chloric acid to weakly acidify it, evaporating the remaining alcoholized concentrate until its bulk is approximately one-third that of the second concentrate, and adding ammonia to weakly alkalinate the third concentrate and thereby precipitate the morphine.

5. The process of extracting alkaloids from dry poppy straw which consists in comminuting dry ripe poppy straw, subjecting the straw to a bath of an aqueous solution of sulphurous acid, evaporating the solution to approximately one-fifth of its original volume to produce a concentrate, neutralizing the concentrate by adding a lye forming a difficultly soluble salt with the acid, adding ethyl alcohol to the concentrate in an amount equal in volume to said concentrate and thereby precipitating impurities from the solution, removing the precipitate from the alcoholized concentrate, evaporating the alcoholized concentrate to form a solution of approximately one-fifth the volume of the original concentrate, adding to the second concentrate an equal bulk of ethyl alcohol and sufficient soda lye to dissolve all morphine whereby to precipitate all remaining impurities and by-alkaloids, removing this second precipitate, treating the remaining concentrate with hydro-chloric acid to weakly acidify it, evaporating the remaining alcoholized concentrate until its bulk is approximately one-third that of the second concentrate, and adding ammonia to weakly alkalinate the third concentrate and thereby precipitate the morphine.

6. The process of extracting alkaloids from dry ripe poppy straw which consists in comminuting dry ripe poppy straw, subjecting the straw to a bath of an aqueous solution of sulphurous acid, evaporating the solution to produce a concentrate, neutralizing the concentrate by adding a lye forming a difficultly soluble salt with the acid, adding ethyl alcohol to the concentrate in an amount equal in volume to said concentrate and thereby precipitating impurities from the solution, removing the precipitate from the alcoholized concentrate, evaporating the alcoholized concentrate, adding to the second concentrate an equal bulk of ethyl alcohol and sufficient soda lye to dissolve all morphine whereby to precipitate all remaining impurities and by-alkaloids, removing this second precipitate, treating the remaining concentrate with hydro-chloric acid to weakly acidify it, evaporating the remaining alcoholized concentrate, and adding ammonia to weakly alkalinate the third concentrate and thereby precipitate the morphine.

7. The process of extracting alkaloids from dry ripe poppy straw which consists in comminuting dry ripe poppy straw, subjecting the straw to a bath of an aqueous solution of a mineral acid, evaporating the solution to produce a concentrate, neutralizing the concentrate by adding a lye forming a difficultly soluble salt with the acid, adding ethyl alcohol to the concentrate in an amount equal in volume to said concentrate and thereby precipitating impurities from the solution, removing the precipitate from the alcoholized concentrate, evaporating the alcoholized concentrate, adding to the second concentrate an equal bulk of ethyl alcohol and sufficient soda lye to dissolve all morphine whereby to precipitate all remaining impurities and by-alkaloids, removing this second precipitate, treating the remaining concentrate with hydro-chloric acid to weakly acidify it, evaporating the remaining alcoholized concentrate, and adding ammonia to weakly alkalinate the third concentrate and thereby precipitate the morphine.

JÁNOS KÁBAY.